United States Patent
Holloway et al.

(10) Patent No.: US 6,398,357 B1
(45) Date of Patent: Jun. 4, 2002

(54) METHOD OF INKJET PRINTING USING INK HAVING HIGH WETTING AGENT LEVELS

(75) Inventors: Ann P. Holloway; Jean Marie Massie, both of Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 09/685,478

(22) Filed: Oct. 10, 2000

(51) Int. Cl.⁷ .............................................. G01D 11/00
(52) U.S. Cl. ..................... 347/100; 347/101; 347/103
(58) Field of Search ............................... 347/101, 103, 347/100

(56) References Cited

U.S. PATENT DOCUMENTS

| | | | |
|---|---|---|---|
| 5,099,256 A | 3/1992 | Anderson | |
| 5,364,461 A | * 11/1994 | Beach et al. | 347/100 |
| 5,365,261 A | 11/1994 | Ozawa et al. | |
| 5,372,852 A | 12/1994 | Titterington et al. | |
| 5,502,476 A | 3/1996 | Neal et al. | |
| 5,623,296 A | 4/1997 | Fujino et al. | |
| 5,640,180 A | 6/1997 | Hale et al. | |
| 5,662,734 A | 9/1997 | Crystal | |
| 5,714,538 A | 2/1998 | Beach et al. | |
| 5,719,204 A | 2/1998 | Beach et al. | |
| 5,746,816 A | 5/1998 | Xu | |
| 5,750,592 A | * 5/1998 | Shinozuka et al. | 347/103 |
| 5,837,754 A | 11/1998 | Shimomura et al. | |
| 5,841,456 A | 11/1998 | Takei et al. | |
| 5,847,026 A | 12/1998 | Kitahara et al. | |
| 5,858,075 A | 1/1999 | Deardurff et al. | |
| 6,196,674 B1 | * 3/2001 | Takemoto | 347/103 |

* cited by examiner

Primary Examiner—John Barlow
Assistant Examiner—Manish S Shah
(74) Attorney, Agent, or Firm—Mark J. Henry; Jacqueline M. Daspit

(57) ABSTRACT

A method of printing uses an inkjet print head to print an ink containing about 0.01 to about 15 wt. % of a wetting agent onto an intermediate transfer surface to form an image on the intermediate transfer surface. The method transfers the image from the intermediate transfer surface to a final medium while the ink is partially wet. The wetting agent may be a 1,2 alkyldiol having 4–10 carbon atoms or a diether alcohol having 6–14 carbon atoms. 1,2 hexanediol and hexylcarbitol, respectively, are particularly suitable wetting agents. If 1,2 hexanediol is used as the wetting agent, the ink may contain about 1.0 to about 5.0 wt. % hexanediol. If hexylcarbitol is used as the wetting agent, the ink may contain about 0.1 to about 2.5 wt. % of hexylcarbitol. The intermediate transfer surface may be coated with a coating solution. In this case, the ink should have a surface energy different from that of the coating solution by no more than about about 10 dynes/cm. The coating solution may contain polyvinyl pyrrolidone, and if so, about 0.01 to about 20 wt. % PVP is suitable. The PVP should have a molecular weight greater than about 400,000.

29 Claims, 1 Drawing Sheet

METHOD OF INKJET PRINTING USING INK HAVING HIGH WETTING AGENT LEVELS

BACKGROUND OF THE INVENTION

1. Field of the Invention

The present invention relates generally to inkjet printing. More specifically, the present invention relates to inkjet printing using an intermediate transfer medium and an ink containing a wetting agent.

2. Description of the Related Art

Early inkjet printers had several distinct advantages over laser printers. They could print in color and had size and cost advantages. However, in order for the next generation of inkjet printers to compete with laser printers in an office environment, it will be necessary to increase the printing speed and print quality. As a goal, a printing speed of 20 pages per minute is desired. For print quality, a print density of 1.4 as measured on an optical densitometer and a resolution of at least 600 dots per inch are desired.

To achieve these goals and successfully compete with laser printers in the business printer market, it has been proposed to print from an inkjet head onto an intermediate transfer surface (e.g. a drum) and then transfer the image onto a final medium (e.g. paper). Prior attempts at this intermediate transfer type printing have resulted in poor transfer efficiency, that is, the image printed onto the intermediate transfer surface did not completely transfer to the final medium. Some of the material deposited on the intermediate transfer surface remained after transfer. Prior attempts at using an intermediate transfer medium with inkjet printing have also resulted in poor optical density.

SUMMARY OF THE INVENTION

The present invention teaches a method of printing which uses an inkjet print head to print an ink containing about 0.01 to about 15 wt. % of a wetting agent onto an intermediate transfer surface to form an image on the intermediate transfer surface. The image is transferred from the intermediate transfer surface to a final medium while the ink is partially wet. The wetting agent may be a 1,2 alkyldiol having 4–10 carbon atoms or a diether alcohol having 6–14 carbon atoms. 1,2 hexanediol and hexylcarbitol, respectively, are particularly suitable wetting agents. If 1,2 hexanediol is used as the wetting agent, the ink may contain about 1.0 to about 5.0 wt. % hexanediol. If hexylcarbitol is used as the wetting agent, the ink may contain about 0.1 to about 2.5 wt. % of hexylcarbitol.

The intermediate transfer surface may be coated with a coating solution. In this case, the ink should have a surface energy different from that of the coating solution by about 10 dynes/cm. Preferably the surface energy of the ink should be 2–9 dynes/cm less than the surface energy of the drum coating solution. The coating solution may contain poly vinyl pyrrolidone, and if so, about 0.01 to about 20 wt. % PVP is suitable, about 0.01 to about 15 wt. % PVP is more preferred and about 2 to about 8 wt. % PVP is most preferred. The PVP should have a molecular weight greater than about 400,000, more preferably greater than about 750,000 and most preferably within the range of from about 850,000 to about 1,150,000.

BRIEF DESCRIPTION OF THE DRAWINGS

The invention will be readily understood by reference to the following description of preferred embodiments described by way of example only, with reference to the accompanying drawing, wherein.

DETAILED DESCRIPTION OF THE PREFERRED EMBODIMENTS

Figure 1:
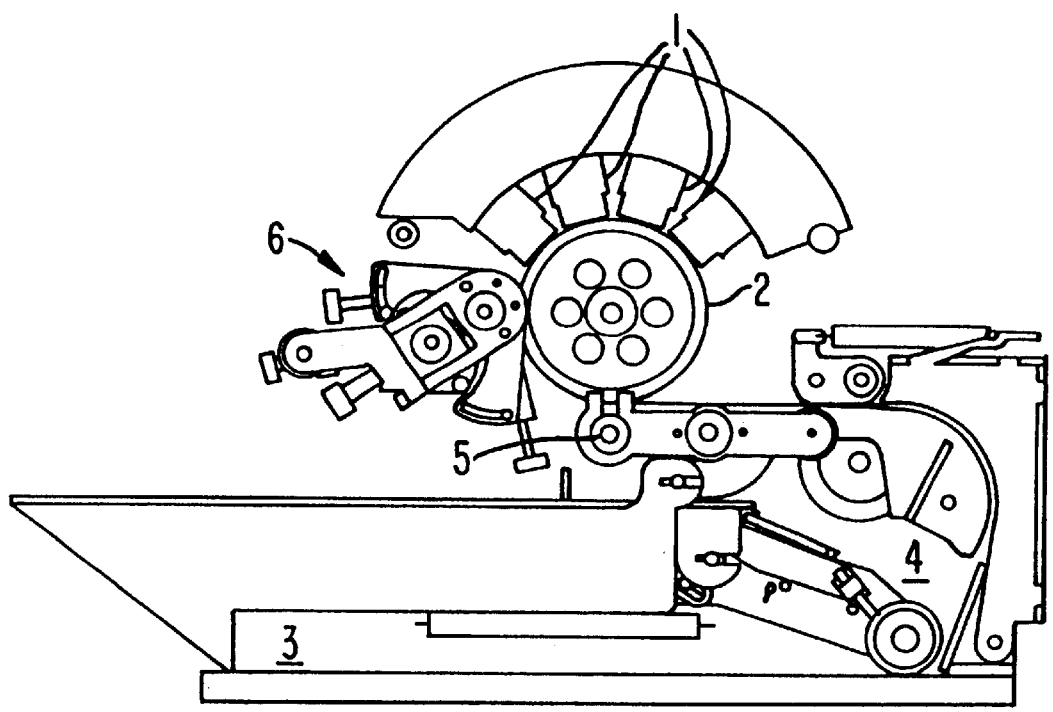
FIG. 1 is the side view of an inkjet printer according to a preferred embodiment of the present invention.

FIG. 1 is the side view of an inkjet printer according to a preferred embodiment of the present invention. One or more inkjet printheads 1 are mounted over an intermediate transfer medium 2 (shown in FIG. 1 as a drum), at a distance of 1 mm or less from the drum. FIG. 1 shows four printheads 1, but the invention is not so restricted. A conventional inkjet printhead can be used with the printer. The ink supplied to the printheads 1 has a relatively high amount of wetting agent. Specifically, the ink should contain about 0.1 to about 15 wt. % wetting agent. More preferably, the ink should contain about 1 to about 5 wt. % wetting agent. Most preferably, the ink should contain about 2.5 to about 3.5 wt. % wetting agent. The purpose of the wetting agent is to ensure that a good image is formed.

Diols and diethers may be used as the wetting agent. For diols, 1,2 alkyl diols having 4–10 carbon atoms are appropriate. 1,2 hexanediol has been found to work particularly well. For diethers, diether alcohols having 6–14 carbon atoms are appropriate. Hexylcarbitol has been found to work particularly well. Comparing diols and diethers, if a diether is used, less wetting agent may be required. For example, about 0.01 to about 2.5 wt. % diether could produce the same good results as about 1.0 to about 5.0 wt. % diol.

The ink used with the present invention employs organic or inorganic pigments as the colorants. The term "pigment" as used herein means an insoluble colorant formed of small pigment particles. The present invention is not restricted to the type of pigment. Pigments such as azo pigments, polycyclic pigments, perylene pigments, anthraquinone pigments, quinacridone pigments, dioxazine pigments, thioindigo pigments, isoindolinone pigments, quinophthalone pigments, nitro pigments, nitroso pigments, aniline black and daylight fluorescent pigments can be used with the invention. Titanium oxide, iron oxide and carbon black are specific pigments known to work well.

Because the pigment is insoluble, it is generally stabilized in a dispersion. The pigment/dispersion mixture is used as a pigment concentrate (also referred to as a "pigment premix") in forming the ink. U.S. Pat. Nos. 5,714,538 and 5,719,204 describe a terpolymer pigment dispersant suitable for use with the present invention. Both of these references are incorporated herein by reference. The pigment/dispersion concentrate (pigment premix) may contain from about 5 to about 20% by wt. pigment and about 0.25% to about 10% by wt. terpolymer dispersant in an aqueous carrier.

In addition to the pigment premix and the wetting agent, the ink may also contain one or more humectants, a biocide and water. The ink may or may not contain other ingredients such as chelating agents, buffers, surfactants, binders, surface tension modifier, etc.

The humectants absorb or retain moisture. Glycerol, propylene glycol, polyethylene glycol and thiodiethanol are possible humectants. For the biocide, Proxel® GXL, commercially available from Avecia, Inc. (formerly Zeneca, Inc.), may be used. Proxel® GXL contains 1,2 benzisothiazolin-3-one as the active ingredient and also contains dipropylene glycol and water.

As to the relative amount of each component, the ink may contain about 1 to about 7 wt. % pigment (from the pigment premix), wetting agent in the amount described above, about 1 to about 50 wt. % humectant(s), with the balance being deionized water.

The following ink compositions have been found to work well with the printing method of the present invention.

| Black | |
|---|---|
| 4 wt. % Carbon black pigment from premix | colorant |
| 10 wt. % Polyethylene Glycol 400 | humectant |
| 10 wt. % 2,2'-Thiodiethanol | humectant |
| 3 wt. % 1,2-Hexanediol | wetting agent |
| Balance - deionized water | |

| Cyan | |
|---|---|
| 2.25 wt. % Cyan pigment from premix, Liojet ® Cyan Base K7088-A2, sold commercially by Toyo Ink Mfg., Co., Ltd. | colorant |
| 10 wt. % Polyethylene Glycol 400 | humectant |
| 10 wt. % 2,2'-Thiodiethanol | humectant |
| 3 wt. % 1,2-Hexanediol | wetting agent |
| Balance - deionized water | |

| Magenta | |
|---|---|
| 4 wt. % Magenta pigment from premix, Liojet ® Magenta Base L4092-A1, sold commercially by Toyo Ink Mfg. Co., Ltd. | colorant |
| 10 wt. % Polyethylene Glycol 400 | humectant |
| 10 wt. % 2,2'-Thiodiethanol | humectant |
| 3 wt. % 1,2-Hexanediol | wetting agent |
| Balance - deionized water | |

| Yellow | |
|---|---|
| 4.5 wt. % Yellow pigment from premix, Liojet ® Yellow Base L2116-A1, sold commercially by Toyo Ink Mfg., Co., Ltd. | colorant |
| 10 wt. % Polyethylene Glycol 400 | humectant |
| 10 wt. % 2,2'-Thiodiethanol | humectant |
| 3 wt. % 1,2-Hexanediol | wetting agent |
| Balance - deionized water | |

The above inks are prepared by mixing the polyethylene glycol, thiodiethanol, hexanediol and deionized water for ten minutes. Then, this mixture is added to the pigment premix while stirring. After another ten minutes of stirring, the pH is adjusted to between about 8.2 to about 8.5 using 20% KOH. The resulting product is filtered with a 1.2 $\mu$m filter.

Referring again to FIG. 1, as the inkjet printheads 1 move along the axis of the drum 2, they are printing. At the same time, drum 2 is rotating. A heater may be provided within the core of the drum 2 to heat the drum 2. The drum 2 may be made of a metal such as stainless steel or aluminum. Alternatively, the drum may have a rigid core, formed of stainless steel, aluminum or other material, covered with a rubber.

The final medium (e.g. paper) is kept within cavity 3. The paper is supplied to the drum 2 from the cavity 3 with a paper feed mechanism 4. From the paper feed mechanism 4, paper is fed through a nip to bring the paper into contact with the drum 2. Specifically, a transfer roller 5 is used to bring the paper into contact with the drum 2. Roller 5 may be solid or formed of a foam urethane, silicone or other type of rubber. Great pressure is not necessary between the roller 5 and the drum 2. A pressure of 25 psi or less is sufficient.

As mentioned above, the drum 2 may be covered with a rubber material. Polyurethane is a preferred rubber material. A liquid cast polyurethane may be used. The prepolymer of the polyurethane polymer may be cured with a polyether, a polyester type polyol or an amine based curative. Any type of rubber may be used to cover the drum, as long as the surface energy of the rubber is similar to the surface energy of the liquid coating solution and ink to allow for good wetting of the rubber with the liquid coating solution.

Both the ink and a liquid coating solution must sufficiently wet the drum. The liquid coating solution is applied to the drum 2 during the print process by a roll coating or other type mechanism 6. The drum 2 rotates in a clockwise direction. Therefore, the coating solution from roll coating mechanism 6 is applied to the drum 2 before the drum 2 reaches the printheads 1. The liquid coating solution forms a sacrificial layer on the drum, which sacrificial layer is transferred along with the image to the paper. By forming a film on the drum, the liquid coating solution increases the transfer efficiency to the paper so that preferably all of the ink is transferred from the drum to the paper. The coating solution further prevents colored inks from bleeding into each other. With these properties, the coating solution increases optical density and improves image resolution. The coating solution should completely coat, or wet, the drum. For this purpose, the coating solution and the drum should have similar surface energies. Usually, the surface energy of the drum is somewhat higher than the surface energy of the coating solution. The surface energy of the solid drum is determined based on the Young Dupré relation using the Kaelble equation of state (J. Adhesion, Vol. 2, page 66 (1970)). The surface energy of the liquid coating solution is determined using the DuNuoy Ring method.

A mixture containing polyvinyl pyrrolidone (PVP) works very well for the liquid coating solution. In the coating solution, PVP may be contained in an amount of about 0.01 to about 20 wt. %. More preferably, PVP is contained in an amount of about 0.01 to about 15 wt. %, and most preferably, PVP is contained in an amount of about 2 to about 8 wt. %. Although the molecular weight can be varied, higher molecular weights are associated with better transfer efficiency. If the molecular weight is extremely high, however, the coating solution becomes very viscous and difficult to apply to the drum. The molecular weight should be over about 400,000. More preferably, the molecular weight should be over about 750,000. Most preferably, the molecular weight should be within the range of about 850,000 to about 1,500,000.

Instead of a PVP homopolymer, a PVP copolymer can be used. A list of suitable PVP copolymers includes copolymers with vinyl acetate, dimethyl aminopropyl methacrylamide, dimethyl amino ethyl methacrylate, quaternized dimethyl amino ethyl methacrylate, and methacryl amido propyl trimethyl ammonium chloride.

Aside from PVP, the liquid coating solution may also contain an organic solvent (preferably a diol or glycol) and water. The liquid coating solution contains about 5 to about 95 wt. % organic solvent and preferably about 50 to about 95 wt. % organic solvent. Suitable solvents include propylene glycol, dipropylene glycol, tripropylene glycol, 1,2 butane diol, glycerol, trimethylene glycol, diethylene glycol, gamma-butyrolactone and 2 pyrrolidone.

The water used for the liquid coating solution is preferably deionized water. The coating solution may contain about 5 to about 90 wt. % water and preferably about 5 to about 50 wt. % water.

The drum coating solution is applied to the drum in an amount of about 0.01 to about 10 mg/cm$^2$, preferably in amount of about 0.1 to about about 3 mg/cm$^2$. The drum coating solution can be applied with a wick, felt pad, 3 roll coating system, foam roller or other method. Again, the drum coating solution should coat, or wet the entire printing surface of the drum.

The liquid coating solution may also contain a flocculating agent, a reagent added to a dispersion of solids in a liquid to bring together fine particles to form "flocs." These flocs are small masses formed in the liquid through coagulation or agglomeration of fine suspended particles. The ink is supplied as a dispersion of solid pigment particles. The flocculating agent "flocculent" counteracts the effect of the ink dispersant. The flocculant therefore causes the pigment to come out of solution and clump together. Once the ink is on the drum or the paper, the flocculant stabilizes the pigment particles to prevent the pigment particles from moving. The flocculant fixes the particles to ensure good print quality.

As mentioned previously, a heater may be provided within the core of the drum 2 to heat the drum 2. When the drum 2 is heated, the liquid within the ink is evaporated, thereby fixing the pigment onto the drum. By forcing the pigment particles out of solution, the flocculant achieves the same goal as the heater. Thus, if the liquid coating solution contains a flocculating agent, it is not necessary to provide a heater within the core of the drum 2.

If a flocculant is to be used, the liquid coating solution may contain 0.1 wt. % to 10 wt. % of the flocculant. More preferably, the liquid coating solution may contain 0.5 wt. % to 5 wt. % of the flocculant. Suitable flocculating agents include multi-valent acids and salts. Suitable acids include carboxylic acids such as citric, glycolic, tartaric, 1,2,3,4, butane tetracarboxylic, glutaric, succinic, lactic, and adipic acids. Suitable salts include $CaCl_2$, $AlCl_3$, and magnesium salicylate tetrahydrate.

Ideally, the surface energy of the ink should differ from that of the coating solution by no more than about 10 dynes/cm. The wetting agent of the ink and the drum coating solution are chosen to achieve this goal. The surface energy of the ink should preferably be about 2 to about 9 dynes/cm less than that of the drum coating solution.

EXAMPLES

1. Example One

A pigmented black ink containing 4 wt. % hexanediol was applied to a rotating drum using an inkjet printhead. The surface of the drum was formed of a Adiprene L42™ (Uniroyal Chemical) cured with polyether polyol Simusol TOIE™ (Seppic). The drum was heated to a temperature of 50° C. and rotated at a speed of 15.1 in/sec. While rotating, a drum coating solution including 5 wt. % PVP K120™ (ISP), 75 wt. % 1,2 propane diol and 20 wt. % deionized water was applied to the drum. The image was transferred from the drum to paper. A silicone foam roller having a 45 Asker C hardness was used as the transfer roller. The system described above produced an image having an optical density of 1.4. The resolution of the image was 600 dots per inch. 20 pages per minute and higher are envisioned by the system.

2. Example Two

A second test example was run using the conditions described above with regard to Example One. However, for Example Two, the drum of Example One as spray coated with Urethane V021™ (Lord Corporation). This gave a very glossy finish. The second example provided excellent results, similar to the first example.

3. Example Three

A black, cyan, yellow or magenta pigmented black ink containing 3 wt. % hexanediol was applied to a rotating drum using an inkjet printhead. The surface of the drum was formed of a Adiprene L42™ (Uniroyal Chemical) cured with polyether polyol Simusol TOIE™ (Seppic). The drum was not heated. However, the drum was rotated at a speed of 15.1 in/sec. While rotating, a drum coating solution including 5 wt. % PVP K90™ (ISP), 5 wt. % citric acid flocculating agent, 60 wt. % propylene glycol and 30 wt. % deionized water, was applied to the drum. The image was transferred from the drum to paper. A PFA sleeved silicone foam was used as the transfer roller. The system described above does not require a heated drum and produces an image having good optical density and resolution.

While the invention has been described in connection with the preferred embodiments, it will be understood that modifications within the principles outlined above will be evident to those skilled in the art.

What is claimed is:

1. A method of printing, comprising:

using an inkjet print head, printing an ink containing about 0.01 to about 15 wt. % of a wetting agent onto the intermediate transfer surface to form an image on the intermediate transfer surface; and transferring an image from the intermediate transfer surface to a final medium while the ink is partially wet, wherein the wetting agent is hexylcarbitol and the ink contains about 0.1 to about 2.5 wt. % of hexylcarbitol.

2. A method of printing, comprising:

coating a intermediate transfer surface with a coating solution;

using an inkjet print head, printing an ink containing about 0.01 to about 15 wt. % of a wetting agent onto the intermediate transfer surface to form an image on the intermediate transfer surface, the ink having a surface energy of about 2 to about 9 dynes/cm less than that of the coating solution; and transferring the image from the intermediate transfer surface to a final medium while the ink is partially wet.

3. A method of printing, comprising:

coating an intermediate transfer surface with a coating solution containing polyvinyl pyrrolidone or polyvinyl pyrrolidone copolymer;

using an inkjet print head, printing an ink containing about 0.01 to about 15 wt. % of a wetting agent onto the intermediate transfer surface to form an image on the intermediate transfer surface; and transferring the image from the intermediate transfer surface to a final medium while the ink is partially wet.

4. A method of printing according to claim 3, wherein the coating solution contains about 0.01 to about 20 wt. % polyvinyl pyrrolidone or polyvinyl pyrrolidone copolymer.

5. A method of printing according to claim 3, wherein the coating solution contains about 0.01 to about 15 wt. % polyvinyl pyrrolidone or polyvinyl pyrrolidone copolymer.

6. A method of printing according to claim 3, wherein the coating solution contains about 2 to about 8 wt. % polyvinyl pyrrolidone or polyvinyl pyrrolidone copolymer.

7. A method of printing according to claim 3, wherein the polyvinyl pyrrolidone or polyvinyl pyrrolidone copolymer has a molecular weight greater than about 400,000.

8. A method of printing according to claim 3, wherein the polyvinyl pyrrolidone or polyvinyl pyrrolidone copolymer has a molecular weight greater than about 750,000.

9. A method of printing according to claim 3, wherein the polyvinyl pyrrolidone or polyvinyl pyrrolidone copolymer has a molecular weight ranging from about 850,000 to about 1,500,000.

10. A method of printing, comprising the steps of:
coating an intermediate transfer surface with a liquid coating solution; and
using an inkjet print head, printing an ink containing about 0.01 to about 15 wt. % of a wetting agent onto the intermediate transfer surface to form an image on the intermediate transfer surface, the ink having a surface energy different from that of the coating solution by no more than about 10 dynes/cm.

11. A method of printing according to claim 10, wherein the surface energy of the ink is about 2 to about 9 dynes/cm less than the surface energy of the coating solution.

12. A method of printing according to claim 10, wherein the wetting agent is selected from the group consisting of 1,2 alkyldiols having 4–10 carbon atoms and diether alcohols having 6–14 carbon atoms.

13. A method of printing according to claim 10, wherein the wetting agent is selected from the group consisting of 1,2 hexanediol and hexylcarbitol.

14. A method of printing according to claim 10, wherein the wetting agent is 1,2 hexanediol and the ink contains about 1.0 to about 5.0 wt. % hexanediol.

15. A method of printing according to claim 10, wherein the wetting agent is hexylcarbitol and the ink contains about 0.1 to about 2.5 wt. % of hexylcarbitol.

16. A method of printing, comprising the steps of:
coating an intermediate transfer surface with a coating solution containing polyvinyl pyrrolidone; and
using an inkjet print head, printing an ink containing about 0.01 to about 15 wt. % of a wetting agent onto an intermediate transfer surface to form an image on the intermediate transfer surface, the wetting agent being selected from the group consisting of hexanediol and hexylcarbitol.

17. A method of printing according to claim 16, wherein the coating solution contains about 0.01 to about 20 wt. % polyvinyl pyrrolidone or polyvinyl pyrrolidone copolymer.

18. A method of printing according to claim 16, wherein the coating solution contains about 0.01 to about 15 wt. % polyvinyl pyrrolidone or polyvinyl pyrrolidone copolymer.

19. A method of printing according to claim 16, wherein the coating solution contains about 2 to about 8 wt. % polyvinyl pyrrolidone or polyvinyl pyrrolidone copolymer.

20. A method of printing according to claim 16, wherein the polyvinyl pyrrolidone or polyvinyl pyrrolidone copolymer has a molecular weight greater than about 400,000.

21. A method of printing according to claim 16, wherein the polyvinyl pyrrolidone or polyvinyl pyrrolidone copolymer has a molecular weight greater than about 750,000.

22. A method of printing according to claim 16, wherein the polyvinyl pyrrolidone or polyvinyl pyrrolidone copolymer has a molecular weight within the range of form about 850,000 to about 1,500,000.

23. A method of printing according to claim 16, wherein the wetting agent is 1,2 hexanediol and the ink contains about 1.0 to about 5.0 wt. % hexanediol.

24. A method of printing according to claim 16, wherein the wetting agent is hexylcarbitol and the ink contains about 0.1 to about 2.5 wt. % of hexylcarbitol.

25. A method of printing, comprising the steps of:
coating an intermediate transfer surface with a coating solution comprising:
polyvinyl pyrrolidone or a polyvinyl pyrrolidone copolymer;
a solvent selected from the group consisting of glycol solvents and diol solvents;
water; and
a flocculating agent; and
using an inkjet print head, printing an ink containing about 0.01 to about 15 wt. % of a wetting agent onto an intermediate transfer surface to form an image on the intermediate transfer surface, the wetting agent being selected from the group consisting of hexanediol and hexylcarbitol.

26. A method of printing according to claim 25, wherein the coating solution comprises:
about 0.01 to about 20 wt. % of the polyvinyl pyrrolidone or the polyvinyl pyrrolidone copolymer;
about 5 to about 95 wt. % of the solvent selected from the group consisting of glycol solvents and diol solvents;
about 5 to about 95 wt. % water; and
about 0.1 to about 10 wt. % flocculating agent.

27. A method of printing according to claim 26, wherein the coating solution comprises about 0.5 to about 5.0 wt. % flocculating agent.

28. A method of printing according to claim 26, wherein the flocculating agent is selected from the group consisting of acids and salts.

29. A method of printing according to claim 26, wherein the flocculating agent is selected from the group consisting of citric acid, glycolic acid, tartaric acid, 1,2,3,4-butane tetracarboxylic acid, glutaric acid, succinic acid, lactic acid, adipic acid, $CaCl_2$, $AlCl_3$ and magnesium salicylate tetrahydrate.

* * * * *